(12) United States Patent
Nakauchi

(10) Patent No.: US 6,955,168 B2
(45) Date of Patent: Oct. 18, 2005

(54) SOLAR HEAT COLLECTING APPARATUS

(75) Inventor: Shunsaku Nakauchi, Mitaka (JP)

(73) Assignee: Kokusai Gijutsu Kaihatsu Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/872,649

(22) Filed: Jun. 21, 2004

(65) Prior Publication Data

US 2004/0261789 A1 Dec. 30, 2004

(30) Foreign Application Priority Data

Jun. 24, 2003 (JP) .......................... 2003-203351
Jan. 29, 2004 (JP) .......................... 2004-55150

(51) Int. Cl.⁷ ................................................ F24J 2/46
(52) U.S. Cl. ................. 126/650; 126/657; 126/706; 126/709
(58) Field of Search ................... 126/648–657, 126/704–709, 712, 672, 907, 908, 660, 666

(56) References Cited

U.S. PATENT DOCUMENTS

| | | | | |
|---|---|---|---|---|
| 3,916,871 A | * | 11/1975 | Estes et al. ................ | 126/666 |
| 4,202,320 A | * | 5/1980 | Bowen ........................ | 126/660 |
| 4,204,521 A | * | 5/1980 | Mattson ...................... | 126/658 |
| 4,289,113 A | * | 9/1981 | Whittemore ................ | 126/570 |
| 5,653,222 A | * | 8/1997 | Newman ..................... | 126/653 |
| 6,119,683 A | | 9/2000 | Nakauchi | |

FOREIGN PATENT DOCUMENTS

JP          11014162          1/1999

* cited by examiner

*Primary Examiner*—Alfred Basichas
(74) *Attorney, Agent, or Firm*—Gauthier & Connors LLP

(57) ABSTRACT

A solar heat collecting apparatus comprises a casing body, a lid for the casing body, a plurality of pillars, and a shield member. The lid for the casing body allows sunlight to pass through the lid and forms a vacuum space in collaboration with the casing body. A plurality of the pillars support the lid. The heat collecting panel is disposed so as to be apart from a side wall of the casing body in the vacuum space, and penetrated by a plurality of the pillars. The shield member blocks at least a part of clearance gaps from the heat collecting panel to the side wall and a plurality of the pillars.

14 Claims, 9 Drawing Sheets

SOLAR HEAT COLLECTING APPARATUS

BACKGROUND OF THE INVENTION

1. Field of the Invention

The present invention relates to a solar heat collecting apparatus for collecting solar heat, and in particular to a solar heat collecting apparatus in which solar heat is collected by a flat plate-shaped heat collecting panel installed in a vacuum space.

2. Description of the Related Art

Conventionally, various types of solar heat collecting apparatus have been suggested. One known solar heat collecting apparatus is a solar heat collector which collects solar heat using a heat-collecting panel in the form of a flat plate installed within a vacuum space. Such a solar heat collecting apparatus of vacuum and flat plate type is disclosed in, for example, U.S. Pat. No. 6,119,683 given to the same applicant of this invention and Japanese Patent Laid-Open Publication No. Hei 11-14162. In such a solar heat collecting apparatus of vacuum and flat plate type, the vacuum space is formed by a casing body and a window glass serving as a lid of the casing body at high vacuum. Inside the vacuum space, a heat collecting panel is placed at a position almost parallel to the window glass. Further, a plurality of pillars are disposed in the vacuum space to support the window glass receiving atmospheric pressure. A plurality of the pillars pass through the heat collecting panel.

Here, as the heat collecting panel absorbs solar heat, the heat collecting panel swells due to thermal expansion, which may cause the heat collecting panel to make contact with the pillars and a side wall of the casing body. When the heat collecting panel touches the pillars and the side wall of the casing body, collected heat will be released to the outside via the casing body and the pillars due to conductive heat transfer properties of the casing body and the pillars, which results in a decrease in efficiency of the heat collecting apparatus. Further, in some cases, the pillars, the casing body, and the heat collecting panel might be damaged. Accordingly, clearance gaps of a sufficient size are provided between the side wall of the casing body and the heat collecting panel, and between the pillars and the heat collecting panel, so as to prevent physical contact with the heat collecting panel from occurring due to thermal expansion of the heat collecting panel.

However, provision of such clearance gaps allows infrared rays of secondary radiation emerging from the undersurface of the heat collecting panel to escape through the clearance gaps to the outside, which causes loss due to radiant heat transfer, that is, so-called radiative leakage. This radiative leakage brings about a state similar to so-called cavity radiation because an area of the clearance gap is far less than that of the undersurface of the heat collecting panel. In cavity radiation, a large amount of radiative leakage is developed from opening of a small area, as described on Pages 385–386 of "Dennetsu Gairon (An Introduction of Heat Transfer)", $29^{th}$ edition, Jul. 20, 1990, written by Yoshiro Kattou, and published by yokendo Co., Ltd. Because a state similar to cavity radiation arises in the solar heat collecting apparatus, opening of a small area, in other words, the clearance gaps from the heat collecting panel to the side wall of the casing body and to the pillars can cause a large amount of radiative leakage. Thus, by creating the clearance gaps from the heat collecting panel to the side wall of the casing body and to the pillars, efficiency of the solar heat collecting apparatus is reduced.

In conventional apparatus, therefore, it has been desired to improve the efficiency by suppressing external radiation of infrared rays.

SUMMARY OF THE INVENTION

In view of the aforementioned problems, this invention was made to reduce or eliminate leakage of infrared rays escaping from at least a part of clearance gaps from a heat collecting panel to a wall surface of a casing body and a plurality of pillars in a solar heat collecting apparatus. Therefore, a solar heat collecting apparatus according to this invention comprises a casing body, a lid for the casing body, the lid allowing sunlight to transmit and forming a vacuum space in collaboration with the casing body, a plurality of pillars supporting the lid, a heat collecting panel which is placed so as to be apart from a wall surface of the casing body in the vacuum space and penetrated by a plurality of the pillars, and a shield member which blocks at least a part of clearance gaps from the heat collecting panel to the wall surface and to a plurality of the pillars.

With this structure, leakage of infrared rays escaping from the clearance gaps can be reduced or eliminated, to thereby enhance the efficiency of the solar heat collecting apparatus.

DESCRIPTION OF THE PREFERRED EMBODIMENTS

Figure 1:
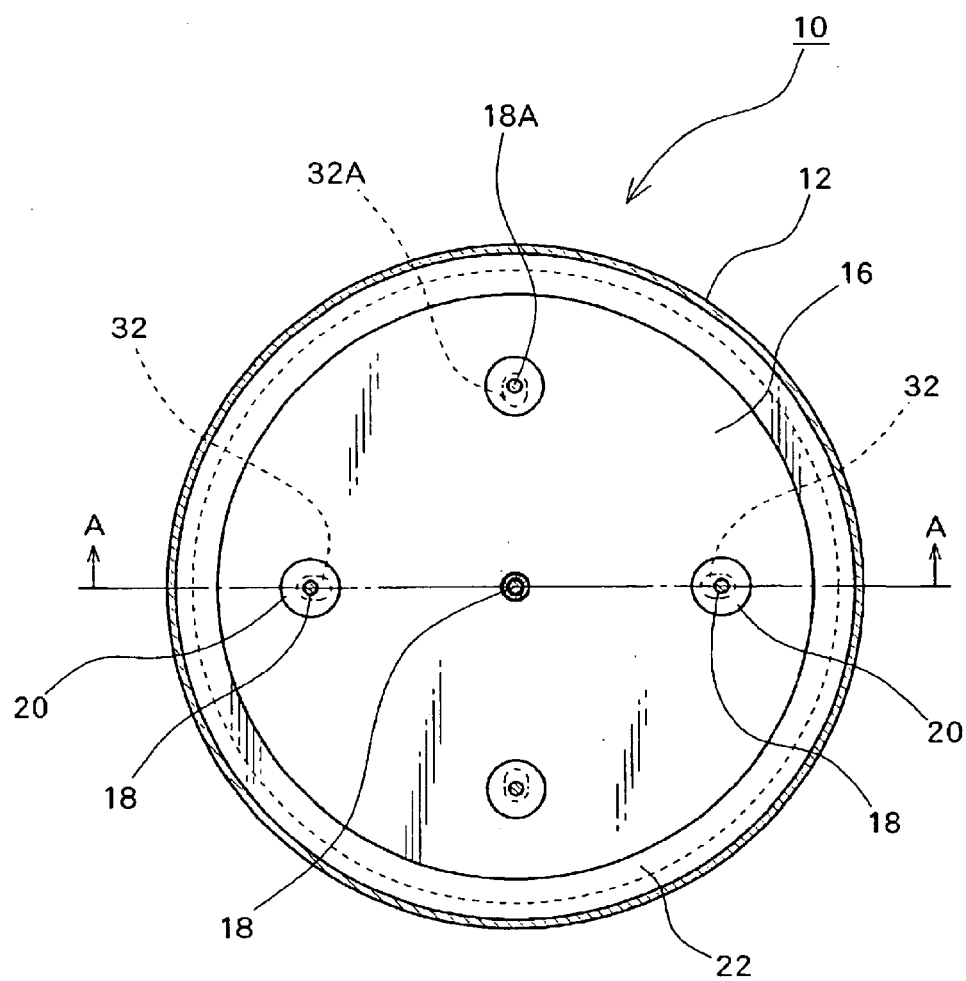
FIG. 1 is a sectional plan view of a solar heat collecting apparatus according to an embodiment of this invention.
Figure 2:
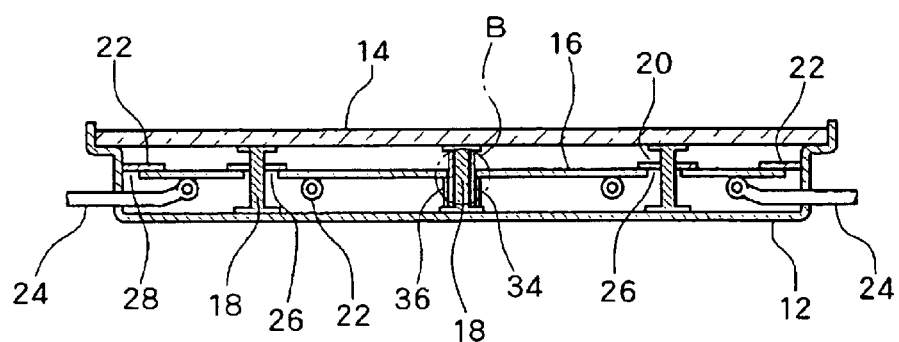
FIG. 2 is an end view taken along line A—A in FIG. 1.

A solar heat collecting apparatus according to an embodiment of this invention will be described with reference to the drawings. FIG. 1 shows a sectional plan view of the solar heat collecting apparatus, and FIG. 2 shows an end view taken along line A—A in FIG. 1. In the solar heat collecting apparatus 10, a vacuum space is formed by a casing body 12 and a window glass 14 serving as a lid for the casing body 12. A heat collecting panel 16 for collecting solar heat is placed in the vacuum space. Collected heat is transferred to a medium (water, for example) flowing through a pipe 24 provided below the heat collecting panel 16. A plurality of pillars 18 are also disposed in the vacuum space to support the window glass 14 subjected to atmospheric pressure. Clearance gaps 26, 28 are provided between a plurality of the pillars 18 and the heat collecting panel 16 and between a side wall of the casing body 12 and the heat collecting panel 18. In order to close the clearance gaps 26, 28, a plurality of shield members 20, 22 are provided. Detailed structure of the solar heat collecting apparatus 10 will be discussed below.

The casing body 12 of the solar heat collecting apparatus 10 is made of a material having rigid property, such as, for example, a metal, and is shaped like a dish whose top is wide open. The window glass 14 is inserted in the opening of the casing body 12 as a lid. The window glass 14 contacts the internal rim of the casing body 12 in a sealing manner to maintain the interior of the casing body 12 at a high vacuum of, for example, 0.1 pascals or lower. The window glass 14 is made of a transparent glass which allows sunlight to pass through.

The reason why the interior of the casing body 12 is maintained at such a high vacuum will be provided below. In a high-vacuum state, heat is conducted under free molecule flow, and under this condition, a flow of thermal energy is proportional to a pressure and a temperature difference but is independent of distance. Therefore, in the high-vacuum state, a good heat insulating property can be obtained even when the clearance gaps between the heat collecting panel 16 and other components (for example, the casing body 12) are small in size. As a result, by keeping the heat collecting panel 16 from contacting a heat conductive body, such as the casing body 12 and the pillars 18, loss of heat collected by the heat collecting panel 16 due to thermal transfer can easily be prevented.

All of the pillars 18 are upright passing through the heat collecting panel 16 in order to support the window glass 14 subjected to atmospheric pressure. The pillars 18 are made of a material having relatively high thermal conductivity, such as a metal. In this embodiment, one of the pillars 18 is disposed almost at the center of the solar heat collecting apparatus 10 and many of the other pillars 18 are placed around this one pillar 18. Although only 5 pillars are shown in the figure, the number of pillars is not limited to 5 and a greater number of pillars may be provided.

The heat collecting panel 16 is a member which evolves heat from irradiated sunlight (in other words, a member for collecting solar heat), and is configured by, for example, a flat metal plate. The heat collecting panel 16 is fixed at a predetermined position by means of a pipe 24 and glass tubes 34, 36 (described later).

The heat collecting panel 16 has a plurality of openings disposed at locations corresponding to the plurality of pillars 18. The openings consist of one circular opening 30 in the shape of a circle provided almost at the center and a large number of oval openings 32 in the shape of an ellipse radially provided around the circular opening 30. In order to reduce (or eliminate) heat loss caused by physical contact with the pillars 18, a plurality of the openings 30, 32 should be placed in such a manner that the heat collecting panel 16 is prevented from touching the metal pillars 18 as much as possible. Therefore, the circular opening 30 and the oval openings 32 are formed in a size larger than that of the pillars 18 to secure clearance gaps of a predetermined size between the heat collecting panel 16 and the pillars 18. In this manner, the heat loss due to thermal transfer can be prevented.

The heat collecting panel 16 made of a metal or the like experiences thermal expansion as a result of collecting solar heat. In the solar heat collecting apparatus of vacuum type, the pillars 18 are maintained at a temperature close to ambient temperature, whereas the heat collecting panel 16 could be heated to a temperature of about 400° C. if the flow of heat transfer medium is stopped for some reason. Therefore, thermal expansion of the heat collecting panel 16 might create a difference in dimension of a few millimeters or greater between the heat collecting panel 16 and the pillars 18. This thermal expansion raises possibilities of heat loss due to physical contact between the heat collecting panel 16 and the pillars 18, and of damaging the apparatus itself. It is therefore preferable to provide clearance gaps each having a size equal to or larger than a few millimeters between the pillars 18 and the edges of the openings 30, 32.

Figure 3:
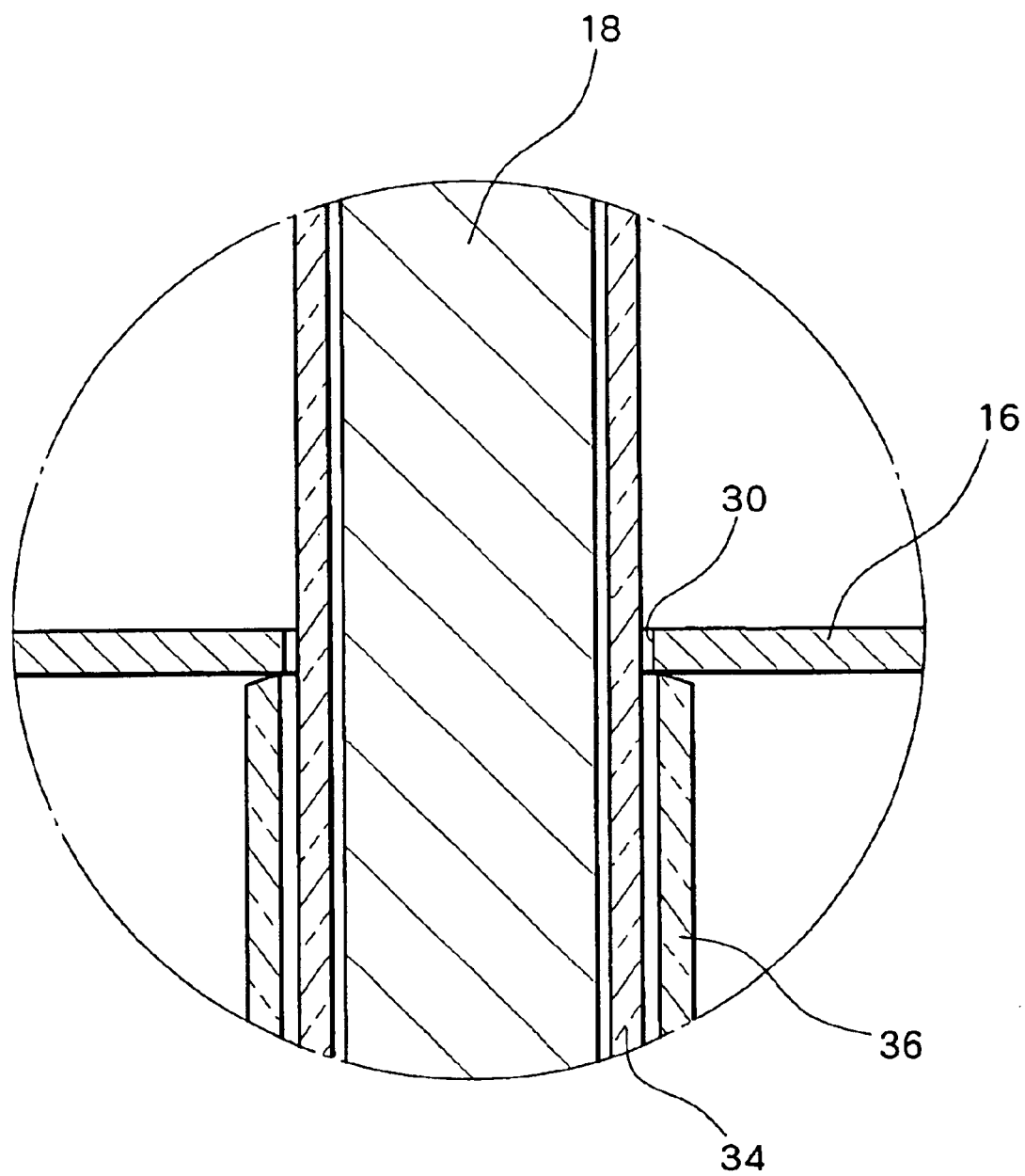
FIG. 3 is an enlarged view of part B in FIG. 2.
Figure 4B:
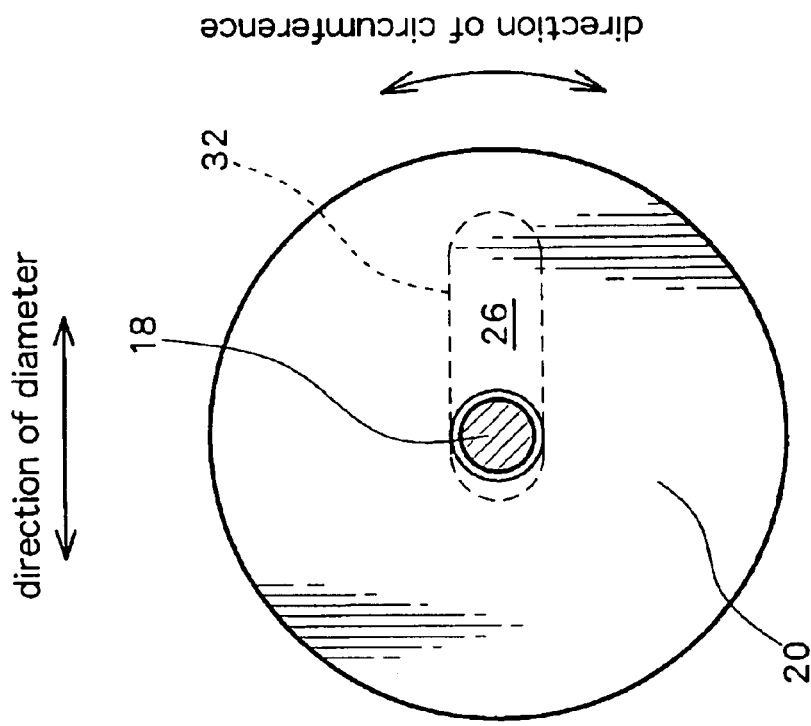
FIG. 4B shows positional a relationship among an oval opening, a pillar, and a first shield member after thermal expansion.
Figure 4A:
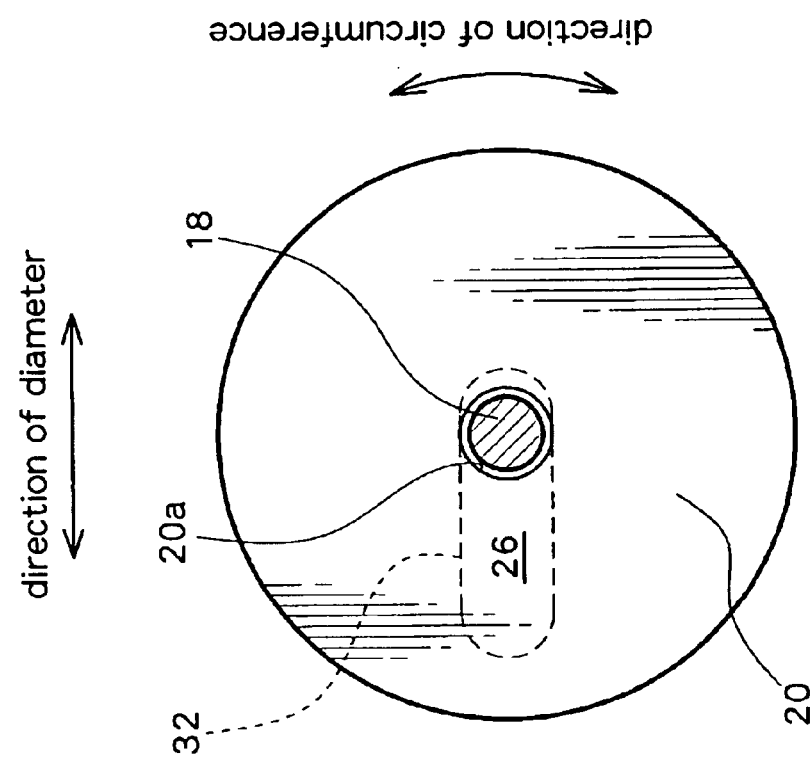
FIG. 4A shows a positional relationship among an oval opening, a pillar, and a first shield member before thermal expansion.

Referring now to FIGS. 3, 4A, and 4B, a positional relationship between the pillars 18 and the openings 30, 32 will be described in detail. FIG. 3 is an enlarged view of part B in FIG. 2. FIGS. 4A and 4B show a positional relationship among an oval opening, a pillar, and a first shield member (described later).

According to this embodiment, the circular opening 30 located at the center of the heat collecting panel 16 is fixed in the middle of the casing body 12 to suppress the influence of thermal expansion of the heat collecting panel 16. In other words, the heat collecting panel 16 is placed so as not to introduce misalignment between the heat collecting panel 16 and the pillar 18. However, even in such an aligned state, a clearance gap may preferably be provided between the pillar 18 at the center and the circular opening 30 to prevent the heat collecting panel 16 from physically contacting the pillar 18.

Because direct contact between the heat collecting panel 16 and the pillar 18 is undesirable in this embodiment, a pipe made of a material with low thermal conductivity, for example, a glass tube 34 is inserted between the pillar 18 and the circular opening 30. Further, another glass tube 36 is provided around the glass tube 34 to support the heat collecting panel 16.

A tiny clearance gap (of 0.1 mm, for example) is provided between the inner glass tube 34 and the edge of the circular opening 30. The reason for providing such a gap even in a case where a member with low conductivity is used is to further reduce (or avoid) heat loss by preventing physical contact with the heat collecting panel 16 to as full an extent as possible. The heat collecting panel 16 having the clearance gap from the inner glass tube 34 is supported by the outer glass tube 36. The top surface of the outer glass tube 36 is cut at a bevel to minimize an area of contact between the heat collecting panel 16 and the glass tube 36, and thereby reduce (or prevent) heat loss due to thermal transfer.

It should be noted that the glass tubes 34, 36 are unnecessary when the pillar 18 at the center is made of a material having low thermal conductivity such as a glass. Further, even if the pillar 18 is made of a metal, provision of the glass tubes 34, 36 may be avoided by forming the circular opening 30 in a size slightly larger than the size of the pillar 18 by approximately 0.1 mm, for example, because insulation can be obtained with such a larger size of the circular opening 30. If the glass tubes 34, 36 are not installed, it is necessary to support the heat collecting panel 16 using another member (for example, a pipe 24) or in another manner.

Then, in a state where only the pillar 18 at the center passes through the circular opening 30, the heat collecting panel 16 can rotate. Therefore, two glass tubes 34, 36 are disposed around one of the peripheral pillars 18 (for example, the pillar 18A shown in FIG. 1) similarly to the pillar 18 at the center. Further, the minor axis of the oval opening (oval opening 32A shown in FIG. 1) corresponding to the one peripheral pillar 18 is formed with a length substantially equal to the outside diameter of the inner glass tube 34. In this manner, rotation of the heat collecting panel 16 can be prevented because the glass tube 34 abuts against the edge of the oval opening 32 even when the heat collecting panel 16 tries to rotate.

The peripheral openings (the oval openings 32) surrounding the circular opening 30 are formed in the shape of an ellipse in view of the fact that thermal expansion occurs in a radial direction because the circular opening 30 at the center is fixed by the pillar 18 and rotational movement of the heat collecting panel 16 is restrained.

Next, referring to FIGS. 4A and 4B, a positional relationship between the peripheral oval openings 32 and their corresponding pillars 18 will be described. Because only one pillar 18 among the peripheral pillars 18 is surrounded by the glass tubes 34, 36, FIGS. 4A and 4B show the positional relationship between the remaining pillars 18 other than the one pillar 18 and the oval openings 32 corresponding to the remaining pillars 18. FIG. 4A shows the oval opening 32 in a state before thermal expansion of the heat collecting panel 16, and FIG. 4B shows the oval opening 32 in a state after thermal expansion of the heat collecting panel 16.

The oval opening 32 moves towards a radial direction of the heat collecting panel 16 due to thermal expansion, as shown in FIGS. 4A and 4B. In view of this movement, the clearance gap 26 of a size sufficient for keeping the edge of the oval opening 32 (i.e. the heat collecting panel 16) from touching the pillar 18 is provided between the edge of the oval opening 32 and the pillar 18.

Similarly, a clearance gap 28 of a sufficient size is provided between the perimeter edge (the circumference outline) of the heat collecting panel 16 and the side wall of the casing body 12 (refer to FIG. 2) to prevent physical contact between the casing body 12 and the heat collecting panel 16 from occurring due to thermal expansion of the heat collecting panel 16, and in turn to avoid both heat loss by thermal transfer and damage to the apparatus itself. The clearance gap 28 between the perimeter edge of the heat collecting panel 16 and the side wall of the casing body may be approximately a few millimeters.

By providing the clearance gaps 26, 28 between the casing body 12 and the heat collecting panel 16 and between the pillar 18 and the heat collecting panel 16, the heat loss through thermal transfer can be reduced or prevented, and the apparatus can thereby be protected from damage. The existence of such clearance gaps 26, 28 may cause infrared rays of secondary radiation generated from the undersurface of the heat collecting panel 16 to escape upward beyond the heat collecting panel 16. The escaped infrared rays are absorbed by the window glass 14, which incurs radiation loss.

Here, because an area of the undersurface of the heat collecting panel 16 is much larger than a total area of the clearance gaps 26, 28, dissipation from the clearance gaps 26, 28 is categorized as so-called cavity radiation. Accordingly, emissivity from the clearance gaps 26, 28 becomes higher than emissivity from the undersurface of the heat collecting panel 16 and becomes close to emissivity from a black body. Further, regardless of the far smaller area of the clearance gaps 26, 28, the amount of leakage of infrared rays escaping through the clearance gaps 26, 28 to the outside is significant to the extent that it cannot be ignored for a solar heat collecting apparatus 10 provided with the objective of reduction of loss.

In view of the above problem, there are provided the first shield member 20 to block the clearance gap 26 between the pillar 18 and the heat collecting panel 16 and the second shield member 22 to block the clearance gap 28 between the side wall of the casing body 12 and the heat collecting panel 16 in this embodiment.

Now, the first shield member 20 will be described referring to FIGS. 2, 4A, and 4B. The first shield member 20 penetrated by the pillar 18 is placed on the heat collecting panel 16 and shaped in the form of a plate (refer to FIG. 2). The first shield member 20 has a sufficient size to cover the oval opening 32 on the heat collecting panel 16 (refer to FIGS. 4A and 4B). In the center of the first shield member 20, a through hole 20a which is slightly larger than the outside diameter of the pillar 18 is formed to allow the pillar 18 to pass through the first shield member 20. When the pillar 18 has a diameter of 3.0 mm, for example, a preferable diameter of the through hole 20a is approximately 3.1 mm. When the first shield member 20 is mounted from above the heat collecting panel 16 while inserting the pillar 18 therein, the first shield member 20 is brought into contact with the heat collecting panel 16 by gravity. A slight interstice exists between the edge of the through hole 20a of the first shield member 20 and the pillar 18. However, because the first shield member 20 does not move beyond the interstice, a position of the first shield member 20 is substantially fixed relative to the pillar 18.

Because the position of the first shield member 20 relative to the pillar 18 is fixed as described above, the first shield member 20 is not shifted even when the oval opening 32 provided on the heat collecting panel 16 is displaced by thermal expansion of the heat collecting panel 16 (refer to FIG. 4B). It should be noted that the first shield member 20 has a size which is sufficiently large for covering the oval opening 32 even when the position of the oval opening 32 is shifted due to thermal expansion of the heat collecting panel 16.

In other words, even when the position of the oval opening 32, and by extension, the position of the clearance gap 26 between the heat collecting panel 16 and the pillar 18 are shifted due to temperature variation of the heat collecting panel 16, the first shield member 20 can consistently cover the clearance 26. Thus, infrared rays of secondary radiation do not escape from the clearance gap 26 between the heat collecting panel 16 and the pillar 18 to the outside. In this manner, the efficiency of the solar heat collecting apparatus 10 is improved. Although the first shield member 20 having a circular shape is shown in FIGS. 4A and 4B, the geometry of the first shield member 20 is not limited to a specific shape so long as the first shield member 20 is of a size sufficient for covering the clearance gap 26.

Figure 5:
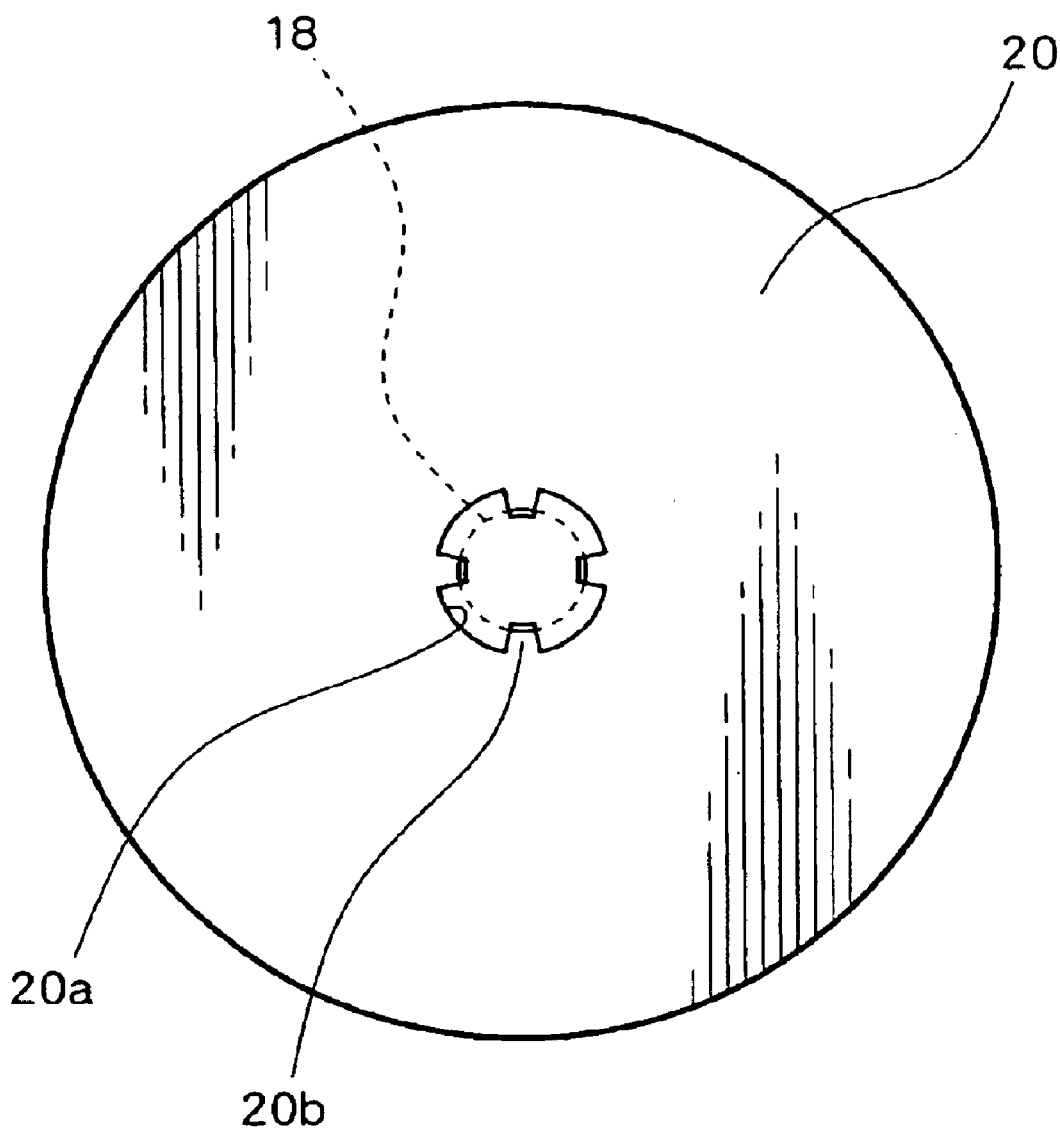
FIG. 5 shows another form of the first shield member.

It should be noted that the reason for making the through hole 20a of the first shield member 20 slightly larger than the outside shape of the pillar 18 in this embodiment is to prevent flow of solar heat toward the pillar 18 through the medium of the first shield member 20 due to physical contact between the fist shield member 20 and the pillar 18. By creating the clearance gap between the first shield member 20 and the pillar 18, loss due to thermal transfer can be suppressed. In a state where only the clearance gap is provided, however, there is a possible danger that the pillar 18 and the first shield member 20 will be brought into contact as a result of movement of the first shield member 20 placed on the heat collecting panel 16 when the heat collecting panel 16 moves due to thermal expansion. In order to prevent this possible danger, a protrusion 20b extending inward may be formed on the edge of the through hole 20a of the first shield member 20 as shown in FIG. 5, and the protrusion 20b may be crimped onto the pillar 18. This crimping ensures that the position of the first shield member 20 relative to the pillar 18 is locked, which in turn makes it possible to secure a predetermined clearance from the pillar 18 at all times.

The second shield member 22 covers the clearance gap 28 between the perimeter edge of the heat collecting panel 16 and the side wall of the casing body 12. The second shield member 22 is a ring-shaped member having the outside diameter substantially equal to the internal diameter of the casing body 12 and the inside diameter which is (for example, a few millimeters) smaller than the outside diameter of the heat collecting panel 16. The second shield member 22 is placed on the heat collecting panel 16 similarly to the first shield member 10 to cover the clearance gap 28 between the heat collecting panel 16 and the side wall of the casing body 12.

Because the inside diameter of the second shield member 22 is smaller than the outside diameter of the heat collecting panel 16, the second shield member 22 can always cover the clearance gap 28 even when the heat collecting panel 16 is expanded due to heat. In this manner, infrared rays of secondary radiation are prevented from escaping through the clearance gap 28 between the heat collecting panel 16 and the side wall of the casing body 12 toward the outside, which can facilitate improvement in the efficiency of the solar heat collecting apparatus 10. It should be noted that the shape of the second shield member 22 is not limited to the ring shape. For example, the second shield member 22 may be shaped in a plate with a rectangular or polygonal through hole whose edge is consistently located within the heat collecting panel 16.

The first and second shield members 20, 22 may be a metal thin plate which reflects infrared rays, or a heat insulating object such as glass, pottery, and ceramics capable of absorbing infrared rays.

When the metal thin plate is used for the shield members 20, 22, the metal thin plate may preferably be made of a metal whose thermal conductivity is low, such as stainless steel, and may be of a thickness equal to or smaller than 0.3 mm. On the other hand, when the nonmetal material is used for the shield members 20, 22, a metal thin plate capable of reflecting infrared rays and suppressing emission of absorption gas may preferably be formed at least on the undersurface (i.e. the surface opposite to a light-receiving surface subjected to sunlight) of the shield members 20, 22.

For the shield members 20, 22, it is desirable for a selective absorption film to be formed on the top surface (the light-receiving surface subjected to sunlight) regardless of whether the metal material is used or the nonmetal material is used. The selective absorption film capable of absorbing solar heat and suppressing emission of far infrared radiation is formed as a multilayer film comprising an oxide of chromium, titanium, etc. prepared by coating and a metal such as gold and silver prepared by evaporation, electrolysis, etc.

By forming the selective absorption film on the top surface, the top surfaces of the first and second shield members 20, 22 are also raised in temperature when receiving sunlight. The undersurfaces of the members, on the other hand, are raised in temperature by making contact with the heat collecting panel 16. Consequently, vertical thermal transfer between the top surface and the undersurface is avoided, which produces an effect of blocking heat from escaping upward. It should be noted that if the first and the second shield members 20, 22 are formed of a heat insulating material, the selective absorption film is formed on the metal thin film provided on the shield members 20, 22 which is of the heat insulating material.

According to this embodiment, the clearance gap 26 between the heat collecting panel 16 and the pillar 18 and the clearance gap 28 between the heat collecting panel 16 and the side wall of the casing body 12 are shielded by the first shield member 20 and the second shield member 22, respectively, to thereby prevent radiative leakage of infrared rays as described above. In an experiment conducted by the inventor of this application, it is found that when the two shield members 20, 22 are provided, saturation temperature of the heat collecting panel 16 while receiving input of solar heat is raised by approximately 25% to 30% at a degree of vacuum in the order of 0.01 pascals. Further, by forming the selective absorption film on the top surface of the shield members 20, 22, heat is kept from escaping upward, which results in the fact that radiation leakage of heat can be reduced.

Figure 6:
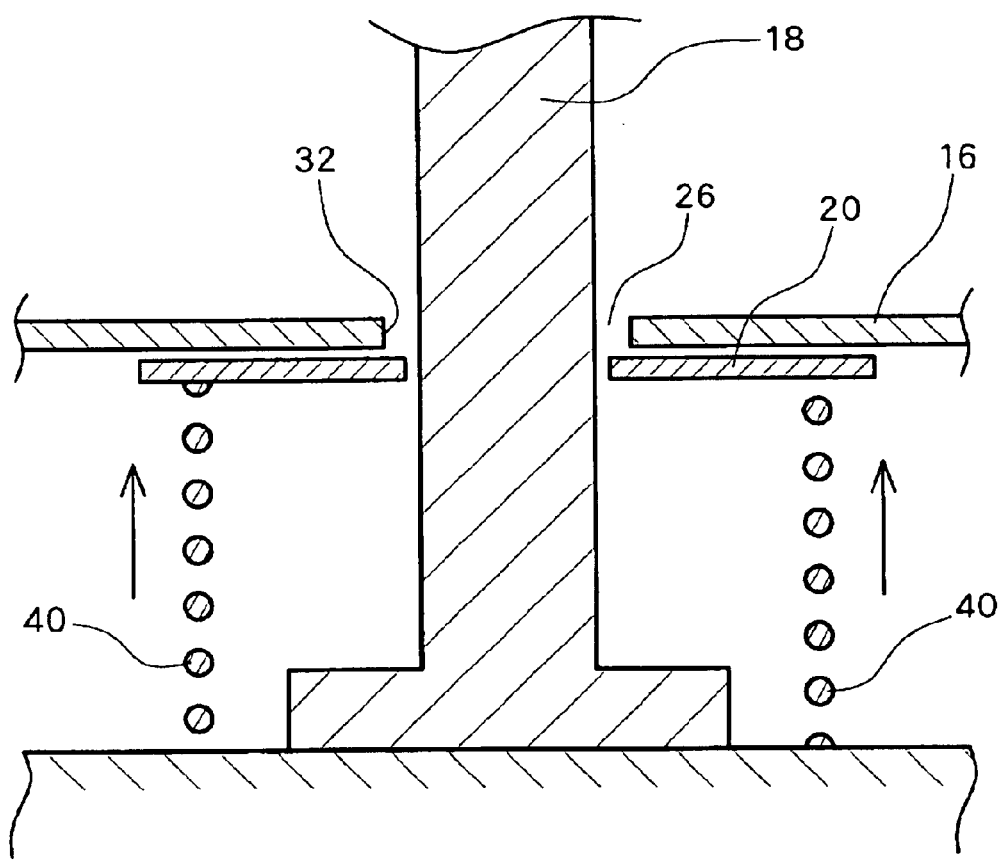
FIG. 6 is an end view showing a region in the vicinity of a pillar according to another embodiment.

Referring now to FIG. 6, another embodiment of this invention will be described. FIG. 6 is an enlarged end view showing a region in the vicinity of the oval opening 32. In this embodiment, the first shield member 20 is placed below the heat collecting panel 16, and subjected to force in a direction toward the heat collecting panel 16 exerted by a spring 40 extending from the bottom surface of the casing body 12. In this manner, the first shield member 20 is kept in a state touching the undersurface of the heat collecting panel 16. Further, the position of the first shield member 20 relative to the pillar 18 is fixed by elastic force of the spring 40. Therefore, if the heat collecting panel 16 is shifted by thermal expansion, the heat collecting panel 16 will slide on the upper surface of the first shield member 20.

Because the clearance gap 26 between the pillar 18 and the heat collecting panel 16 is also blocked in this embodiment, radiative leakage of infrared rays via the clearance gap 26 is prevented, which in turn enables improvement in the efficiency of the solar heat collecting apparatus 10.

Figure 7:
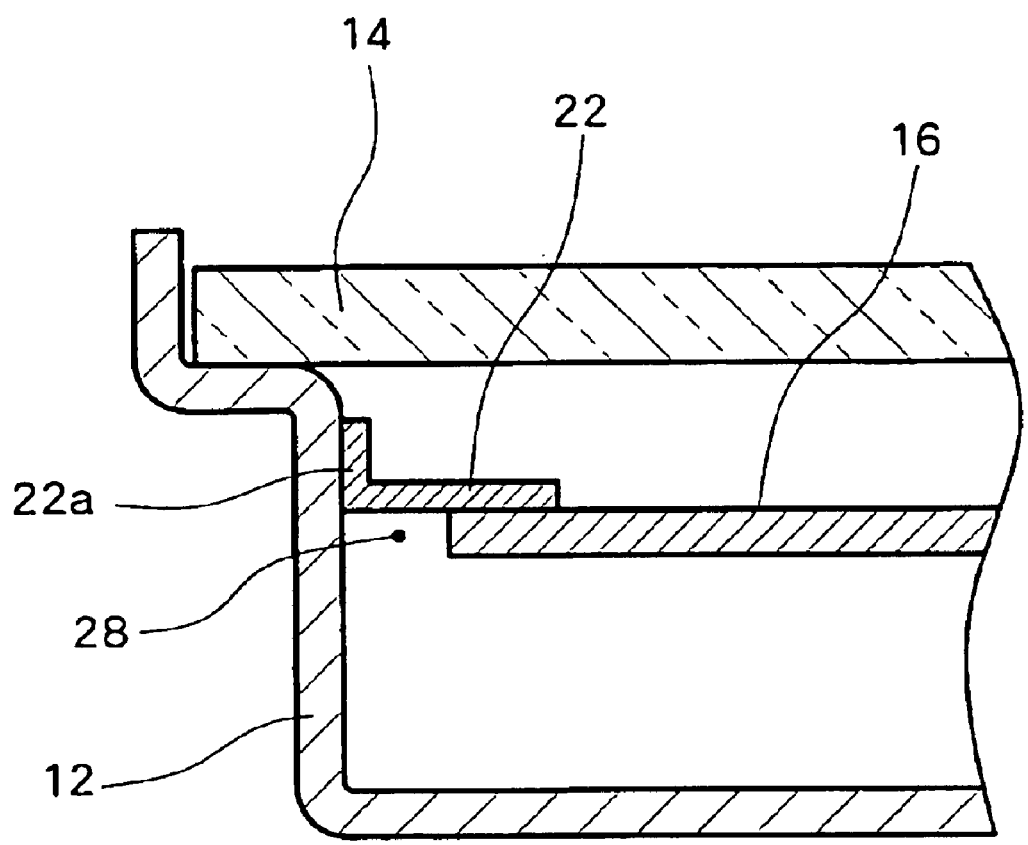
FIG. 7 is a vertical end view showing an essential part of another embodiment.

Referring now to FIG. 7, another embodiment will be described. FIG. 7 is a vertical end view showing an essential part of this embodiment. In the second shield member 22 according to this embodiment, a vertical frame part 22a is attached to the rim thereof so as to form the second shield member 22 in a shape like a letter L in vertical cross section. By brazing the rise 22a to the side wall of the casing body 12, the second shield member 22 is fixed onto the casing body 12. As the remaining structure of this embodiment is identical to the structure according to the former embodiment, description thereof is not repeated. As in the case of the former embodiment, the clearance gap 28 between the side wall of the casing body 12 and the heat collecting panel 16 is also blocked in this embodiment to thereby prevent radiative leakage of infrared rays through the clearance gap 28, which enables improvement in the efficiency of the solar heat collecting apparatus 10. Further, by adhering the second shield member 22 to the casing body 12, the position of the second shield member 22 can be established more accurately.

Figure 8:
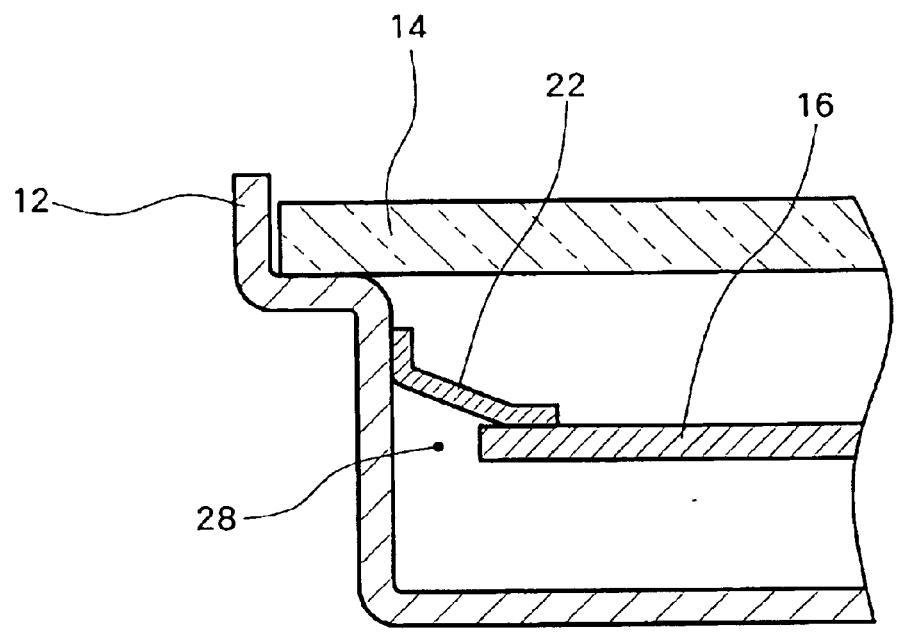
FIG. 8 is a vertical end view showing an essential part of still another embodiment.

Referring now to FIG. 8, yet another embodiment will be described. FIG. 8 is a vertical end view showing an essential part of this embodiment. In this embodiment, the second shield member 22 is made of an elastic material, and fixed to the side wall of the casing body 12 in a position slanting from above the heat collecting panel 16 toward the heat collecting panel 16. The second shield member 22 makes contact with the heat collecting panel 16 at a tip. As the second shield member 22 has elasticity, reliable contact between the second shield member 22 and the heat collecting panel 16 can be realized by changing the angle of inclination of the second shield member 22 as appropriate. It should be noted that the second shield member 22 may be placed below the heat collecting panel 16 and slanted toward the undersurface of the heat collecting panel 16 from below.

Figure 9:
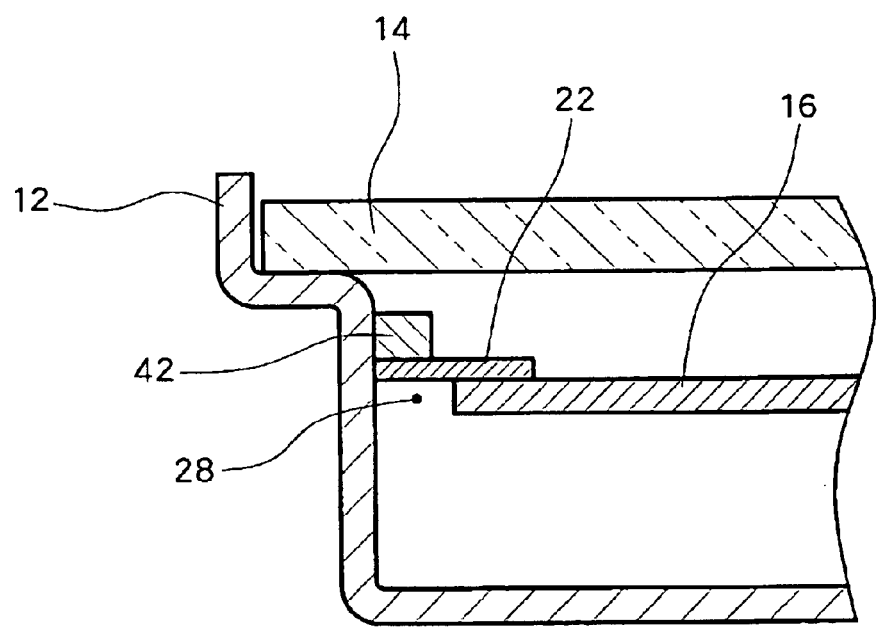
FIG. 9 is a vertical end view showing an essential part of yet another embodiment.

Referring now to FIG. 9, another embodiment will be described. FIG. 9 is a vertical end view showing an essential part of this embodiment. The second shield member 22 according to this embodiment includes a plurality of weights 42 brazed to the rim of the second shield member 22. The second shield member 22 with the weights 42 is placed on the heat collecting panel 16 and kept in a state contacting with the heat collecting panel 16 by means of the weight of the weights 42 themselves. Because the weights 42 are attached to the second shield member 22 in this embodiment, the second shield member 22 can be maintained on the heat collecting panel 16 in a more stable manner.

Figure 10:
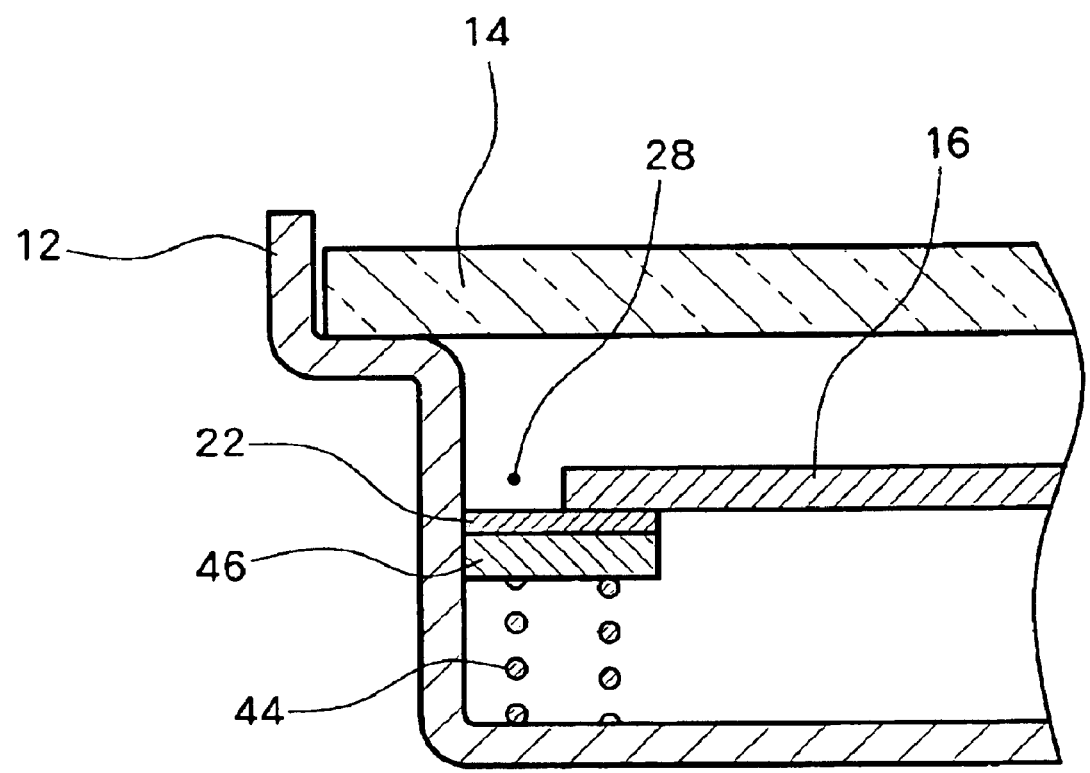
FIG. 10 is a vertical end view showing an essential part of another embodiment.

Referring now to FIG. 10, still another embodiment will be described. FIG. 10 is a vertical end view showing this embodiment. In this embodiment, the second shield member 22 is provided below the heat collecting panel 16 and subjected to force exerted by an elastic member such as a plurality of springs 44 or the like in a direction toward the heat collecting panel 16. In addition, a support 46 is installed on the undersurface of the second shield member 22, and as a result the force of the springs 44 is transferred via the support 46 to the second shield member 22. The support 46 is made of a heat insulating material formed in a shape identical to that of the second shield member 22. By pressing the support 46 in a direction toward the heat collecting panel 16 by means of the springs 44, the second shield member 22 is brought into intimate contact with the undersurface of the heat collecting panel 16.

Figure 11:
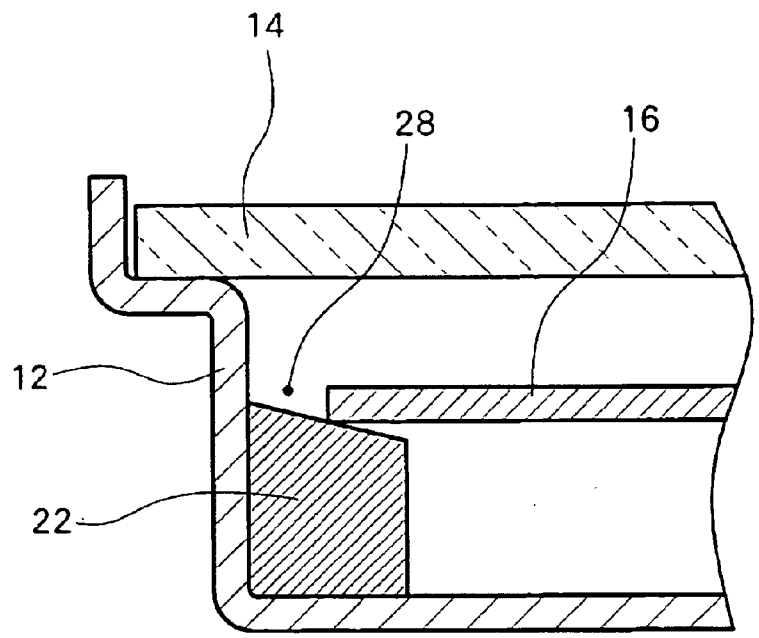
FIG. 11 is a vertical end view showing an essential part of still another embodiment.

Referring now to FIG. 11, yet another embodiment will be described. FIG. 11 is a vertical end view showing an essential part of this embodiment. The second braking member 22 according to this embodiment is a tubular column extending from the bottom surface of the casing body 12 to the immediate vicinity of the heat collecting panel 16.

The second shield member 22 is made of a heat insulating material having a heat resisting property such as, for example, glass or pottery. Similarly to the former embodiment, the second shield member 22 has the outside diameter substantially equal to the inner diameter of the casing body 12 and the inside diameter smaller than the outside diameter of the heat collecting panel 16 at ordinary temperatures.

The top of the second shield member 22, i.e. the surface to be brought into contact with the heat collecting panel 16, declines toward the inside from the outside, which helps to reduce an area of physical contact between the second shield member 22 and the heat collecting panel 16, and in turn facilitates suppression of heat loss due to thermal transfer. The top of the second shield member 22 may of course decline toward the outside from the inside. Further, the second shield member 22 may not necessarily be inclined.

The top of the second shield member 22 may be flat. Because the second shield member 22 supports the heat collecting panel 16 in this embodiment, the heat collecting panel 16 can be reliably maintained in its horizontal position. Further, as in the case with the above embodiments, radiative leakage of infrared rays can be reduced or avoided, thereby enhancing the efficiency of the solar heat collecting apparatus 10 is.

Figure 12:
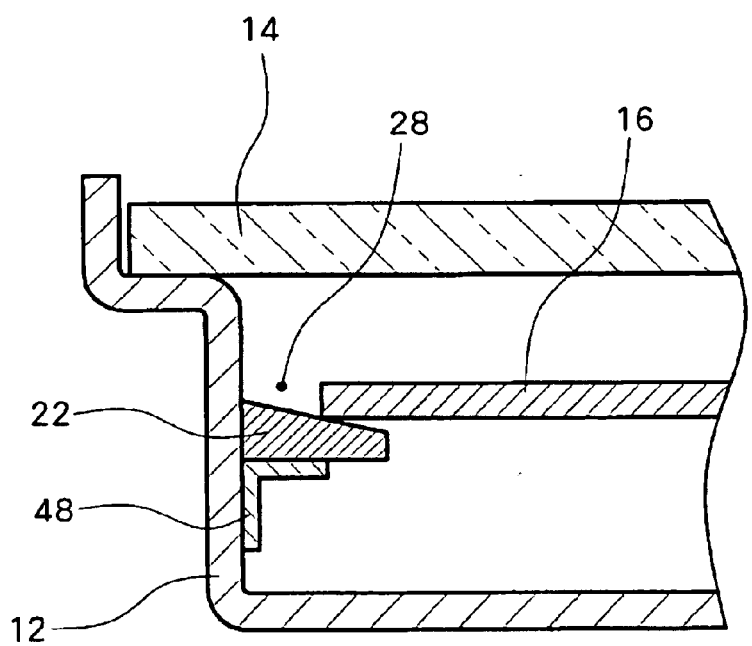
FIG. 12 is a vertical end view showing an essential part of another embodiment.

Referring now to FIG. 12, another embodiment will be described. FIG. 12 is a vertical end view showing an essential part of this embodiment. The second shield member 22 according to this embodiment is a ring-shaped member provided below the heat collecting panel 16 and supported by a supporting object 48 fixed on the side wall of the casing body 12. The supporting object 48 is a ring-shaped member made of a material having a thermal insulation property and fixed on the side wall of the casing body 12 by brazing, or other means. The supporting object 48 may be formed in the shape of a tubular column extending from the bottom surface of the casing body 12 similarly to the second shield member as show in FIG. 11.

The top of the second shield member 22, i.e. the surface to be brought into contact with the heat collecting panel 16, is sloped to make the area of physical contact between the second shield member 22 and the heat collecting panel 16 smaller. Further, the second shield member 22 helps the heat collecting panel 16 maintain its horizontal position. When the second shield member 22 is formed of a heat insulating material, a metal thin film having low emissivity with respect to infrared rays is formed on the top surfaces of both the second shield member 22 and the supporting object 48. In this manner, loss due to radiant heat transfer can be reduced.

Here, an explanation about prevention of loss due to secondary radiation emerging from the undersurface of the heat collecting panel 16 will be briefly provided. Loss due to secondary radiation from the undersurface of the heat collecting panel 16 includes loss emitted from the undersurface of the heat collecting panel 16 toward the bottom surface of the casing body 12 in addition to the above-described loss escaping from the clearance gaps 26, 28 to the outside. Accordingly, it is important for suppression of secondary radiation to minimize secondary radiation itself by lowering emissivity of the undersurface and to enhance reflectivity of the bottom surface of the casing body 12 receiving the radiation as well as shielding the clearance gaps 26, 28.

Although the emissivity of the undersurface of the heat collecting panel 16 differs according to type, surface conditions, wavelength, and other properties of the metal to be used, emissivity of secondary radiation with the wavelengths (ranging from about 5 to 15 microns) at temperatures in the range (of from about 30° C. to 150° C.) covered by typical solar heat collecting apparatus declines in an analogous fashion for various types of metals. In particular, the emissivity of a metal surface prepared by vacuum evaporation is approximately 0.015 to 0.025 which is smaller than emissivity of a polished surface and a surface formed by sputtering (refer to the topic on spectral reflectance of metal surfaces in "Rikanenpyou (Chronological Scientific Data)").

Accordingly, in order to reduce loss due to secondary radiation of infrared rays emerging from the undersurface of the heat collecting panel 16 having been heated, it is effective to provide a thin film made of a metal such as gold, silver, copper, aluminum, etc. on the undersurface of the heat collecting panel 16, the bottom surface of the casing body 12 facing the undersurface of the heat collecting panel 16, the surfaces of the pillars 18, and surfaces of other components. Because of the high reflectivity with respect to infrared rays (in other words, low emissivity for infrared rays) belonging to the metal thin film, radiation can be suppressed. Among various metals having high reflectivity, copper, in particular, is good in quality and inexpensive, and thereby most amenable for the thin film.

Adverse effects produced by absorption gases contained within the casing body 12, the heat collecting panel 16, and other components when the absorption gases seep into the interior of the casing body 12 are almost eliminated during a baking operation in the manufacturing process. However, by further providing a getter material at least partially to the undersurface of the heat collecting panel 16 and the bottom surface of the casing body 12, the interior of the casing body 12 is maintained at high vacuum over the long term. The above-described metal to be provided for reducing radiation of infrared rays emerging from the undersurface of the heat collecting panel 16 and the bottom surface of the casing body 12 may also be used as a getter member, of course. When the metal thin film is shared as the getter member, aluminum is a suitable material for the metal thin film to be provided for reducing radiation of infrared rays because it is known that aluminum is known as a good getter material for absorbing absorption gases.

More specifically, by using aluminum as the metal to form an evaporation thin film, the radiation loss can be suppressed by the high reflectivity in the range of far-infrared rays belonging to aluminum. In addition, using the getter function of aluminum of absorbing a gas, gases seeping from the window glass 14 and the metal in the casing body 12 are absorbed, which makes it possible to maintain the interior of the casing body 12 at a high vacuum over a long time.

In the manufacturing process of the solar heat collecting apparatus 10 of this invention, there is provided a baking operation executed at high vacuum and at an elevated temperature to purge the absorption gases contained in the casing body 12, the window glass 14, and other components to maintain the high vacuum state over an extended period of time. The degree of vacuum in the baking operation is preferably maintained at about 0.001 pascals. During the baking operation, the undersurface of the heat collecting panel 16 and the bottom surface of the casing body 12 are further subjected to vacuum evaporation of aluminum.

When the baking operation is executed, a plurality of the pillars 18 are upright in the interior of the casing body 12. Further, the heat collecting panel 16, the shield members 20, 22, and other components are also provided in the interior. Therefore, if vacuum evaporation is executed by a vacuum evaporator placed between the heat collecting panel 16 and the bottom surface of the casing body 12, components such as the shield members 20, 22, and the pillars 18 are all subjected to the vacuum evaporation of aluminum, which further enhances the efficiency of the solar heat collecting apparatus 10. In this case, aluminum is not evaporated on the window glass 14 because the clearance gaps 26, 28 are blocked by the shield member 20, 22.

As has been described above, the efficiency of the solar heat collecting apparatus can be improved according to this invention. Although the above embodiments have been described using the solar heat collecting apparatus shaped in a circle, this invention can be applied to a solar heat collecting apparatus having other shapes by modifying each of the components as appropriate. It should be easily understood by a person skilled in the art that the shape of the solar heat collecting apparatus is not limited to a circle and may be rectangular or another form.

What is claimed is:

1. A solar heat collecting apparatus comprising:
   a casing body;
   a lid for the casing body which allows sunlight to transmit and forms a vacuum space in collaboration with the casing body;
   a plurality of pillars for supporting the lid;
   a heat collecting panel disposed in the vacuum space so as to be apart from a wall surface of the casing body, and penetrated by a plurality of the pillars;
   a shield member blocking at least a part of clearance gaps from the heat collecting panel to the wall surface and to a plurality of the pillars;
   wherein the shield member is made of a nonmetal material having a heat insulating property; and
   wherein the shield member has a metal thin film for reflecting infrared rays, the metal thin film formed at least on a surface opposite to a light-receiving surface on which the sunlight is received.

2. A solar heat collecting apparatus according to claim 1, wherein the shield member is provided with a selective absorption film of a thin film capable of absorbing solar heat and suppressing infrared radiation, on a light-receiving surface on which the sunlight is received.

3. A solar heat collecting apparatus according to claim 1, wherein the shield member comprises:
   a first shield member blocking a clearance gap between the pillars and the heat collecting panel, and
   a second shield member blocking a clearance gap between the wall surface of the casing body and the heat collecting panel.

4. A solar heat collecting apparatus according to claim 3, wherein the first shield member has an opening whose size is slightly larger than the external diameter of the pillars to an extent that a small clearance from the pillar is created when the pillar is inserted into the first shield member.

5. A solar heat collecting apparatus according to claim 4, wherein the opening has a protrusion which can be crimped onto a side surface of the pillar on the edge.

6. A solar heat collecting apparatus according to claim 4, wherein the first shield member is subjected to a force exerted by an elastic body in a direction toward the heat collecting panel.

7. A solar heat collecting apparatus according to claim 3, wherein the second shield member is a ring-shaped member having an external diameter of a size allowing the second shield member to touch the internal surface of the casing body, and an internal diameter of a size reaching the inside of the heat collecting panel.

8. A solar heat collecting apparatus according to claim 7, wherein the second shield member is inclined at a surface being in contact with the heat collecting member.

9. A solar heat collecting apparatus according to claim 7, wherein the second shield member is supported by an elastic body exerting a force in a direction toward the heat collecting panel.

10. A solar heat collecting apparatus according to claim 7, wherein the second shield member is provided below the heat collecting panel and supported by a supporting member fixed onto the wall surface of the casing body.

11. A solar heat collecting apparatus according to claim 7, wherein the second shield member is a tubular column extending from the bottom surface of the casing body.

12. A solar heat collecting apparatus according to claim 7, wherein the second shield member is fixed onto the wall surface of the casing body.

13. A solar heat collecting apparatus according to claim 12, wherein the second shield member is made of a material having elasticity.

14. A solar heat collecting apparatus according to claim 7, wherein the second shield member is provided on the heat collecting panel and pressed against the heat collecting panel by one or more weights provided on the second shield member.

* * * * *